United States Patent
Meng et al.

(10) Patent No.: US 7,444,310 B2
(45) Date of Patent: Oct. 28, 2008

(54) AUTOMATIC MODEL MAINTENANCE THROUGH LOCAL NETS

(75) Inventors: Zhuo Meng, Broadview Heights, OH (US); Yoh-Han Pao, Cleveland Heights, OH (US); Baofu Duan, Cleveland Heights, OH (US)

(73) Assignee: Computer Associates Think, Inc., Islandia, NY (US)

( * ) Notice: Subject to any disclaimer, the term of this patent is extended or adjusted under 35 U.S.C. 154(b) by 762 days.

(21) Appl. No.: 10/401,930

(22) Filed: Mar. 28, 2003

(65) Prior Publication Data

US 2003/0200075 A1    Oct. 23, 2003

Related U.S. Application Data

(60) Provisional application No. 60/373,780, filed on Apr. 19, 2002, provisional application No. 60/373,977, filed on Apr. 19, 2002, provisional application No. 60/374,020, filed on Apr. 19, 2002, provisional application No. 60/374,024, filed on Apr. 19, 2002, provisional application No. 60/374,041, filed on Apr. 19, 2002, provisional application No. 60/374,064, filed on Apr. 19, 2002.

(51) Int. Cl.
*G06N 5/00* (2006.01)

(52) U.S. Cl. .......................................... 706/15; 706/45

(58) Field of Classification Search .................. 705/15; 702/27; 704/256.5
See application file for complete search history.

(56) References Cited

U.S. PATENT DOCUMENTS

| | | | |
|---|---|---|---|
| 4,193,115 A | 3/1980 | Albus | |
| 4,215,396 A | 7/1980 | Henry et al. | |
| 4,438,497 A | 3/1984 | Willis et al. | |
| 4,649,515 A | 3/1987 | Thompson et al. | |
| 4,663,703 A | 5/1987 | Axelby et al. | |
| 4,670,848 A | 6/1987 | Schramm | |
| 4,740,886 A | 4/1988 | Tanifuji et al. | |
| 4,754,410 A | 6/1988 | Leech et al. | |
| 4,858,147 A | 8/1989 | Conwell | |
| 4,928,484 A | 5/1990 | Peczkowski | |
| 4,972,363 A | 11/1990 | Nguyen et al. | |
| 4,979,126 A | 12/1990 | Pao et al. | |
| 4,994,982 A | 2/1991 | Duranton et al. | |
| 5,023,045 A | 6/1991 | Watanabe et al. | |
| 5,033,087 A * | 7/1991 | Bahl et al. ............... | 704/256.5 |
| 5,052,043 A | 9/1991 | Gaborski | |
| 5,111,531 A | 5/1992 | Grayson et al. | |

(Continued)

OTHER PUBLICATIONS

William H. Hsu and William M. Pottenger and Michael Weige and Jie. Wu and Ting-Hao Yang, Genetic algorithms for selection and partitioning of attributes in large-scale data mining problems, Data Mining with Evolutionary Algorithms: Research Directions, pp. 1-6, AAAI Press, Jul. 18, 1999.*

(Continued)

*Primary Examiner*—Wilbert L Starks, Jr.
(74) *Attorney, Agent, or Firm*—Baker Botts L.L.P.

(57) ABSTRACT

A model maintenance method is provided. If accuracy of prediction by a current model through consultation with new data is determined to be below a predetermined threshold, a compound model is formed by supplementing the current model with a local net trained with the new data.

28 Claims, 6 Drawing Sheets

U.S. PATENT DOCUMENTS

| | | | |
|---|---|---|---|
| 5,113,483 | A | 5/1992 | Keeler et al. |
| 5,119,468 | A | 6/1992 | Owens |
| 5,140,523 | A | 8/1992 | Frankel et al. |
| 5,142,612 | A | 8/1992 | Skeirik |
| 5,175,678 | A | 12/1992 | Frerichs et al. |
| 5,175,797 | A | 12/1992 | Funabashi et al. |
| 5,247,445 | A | 9/1993 | Miyano et al. |
| 5,311,421 | A | 5/1994 | Nomura et al. |
| 5,335,291 | A | 8/1994 | Kramer et al. |
| 5,349,541 | A | 9/1994 | Alexandro et al. |
| 5,485,390 | A | 1/1996 | LeClair et al. |
| 5,734,796 | A | 3/1998 | Pao |
| 5,835,901 | A | 11/1998 | Duvoisin, III et al. |
| 5,848,402 | A | 12/1998 | Pao et al. |
| 6,134,537 | A | 10/2000 | Pao et al. |
| 6,327,550 | B1 | 12/2001 | Vinberg et al. |
| 6,691,045 | B1 * | 2/2004 | Labute .................. 702/27 |

OTHER PUBLICATIONS

Ersoy, O. K. et al., "Parallel, Self-Organizing, Hierarchical Neural Networks" IEEE Transactions on Neural Networks, IEEE Inc., New York, US, vol. 1, No. 2, Jun. 1990, pp. 167-178, XP 000133516, ISSN: 1045-9227.

Surajit Chaudhuri, Usama Fayyad and Jeff Bernhardt, "Scalable Classification over SQL Databases", *Proceedings of the 15th International Conference on Data Engineering*, Mar. 23-26, 1999, *Sidney, Austalia*, pp. 470-479.

Dennis T. Lee, Yoh-Han Pao and Dejan J. Sobajic "Dynamic System Control Using Neural Networks", pp. 25-30.

Yoh-Han Pao "Neural Net Computing For Patter Recognition" *Handbook of Pattern Recognition, and Computer Vision*, pp. 125-162 (edited by C.H. Chen, L.F. Pau and P.S.P. Wang).

Bernard Widrow, Narendra K. Gupta, and Sidhartha Maitra (Sep. 1973) "Punish/Reward: Learning With a Critic in Adaptive Threshold Systems", *IEEE Trans. Systems, Man and Cybernetics*, vol. SMC-3, No. 5, pp. 455-465.

John A. Hartigan, (1975) "Interpretation and Evaluation of Clusters", *Clustering Algorithms*, pp. 12-14.

Yoh-Han Pao and Dejan J. Sobajic (1987) "Metric Synthesis and Concept Discovery With Connectionist Networks", 1987 *IEEE*, pp. 390-395.

Bernard Widrow and Rodney Winter (March 1988) "Neural Nets for Adaptive Filtering and Adaptive Pattern Recognition", *IEEE Computer*, pp. 25-39.

Bernard Widrow, Rodney G. Winter, and Robert A. Baxter (Jul. 1988) "Layered Neural Nets for Pattern Recognition", *IEEE Trans. Acoustics, Speech, and Processing*, vol. 36, No. 7, pp. 1109-1118.

Yoh-Han Pao, (1989) *Adaptive Pattern Recognition and Neural Networks*.

Andrew G. Barto (1990) "Connectionist Learning for Control", *Neural Networks for Control*, pp. 5-58 (edited by W. Thomas Miller, III, Richard S. Sutton and Paul J. Werbos).

R.D. Coyne and A.G. Postmus (1990) "Spatial Applications of Neural Networks in Computer-aided Design", *Artifical Intelligence in Engineering*, 5(1):9-22.

Kumpati S. Narendra and Kannan Parthasarathy (Mar. 1990) "Identification and Control of Dynamical Systems Using Neural Networks", *IEEE Trans. Neural Networks*, vol. 1, No. 1, pp. 4-27.

Maryhelen Stevenson, Rodney Winter, and Bernard Widrow (Mar. 1990) "Sensitivity of Feedforward Neural Networks to Weight Errors", *IEEE Trans. Neural Networks*, vol. 1, No. 1, pp. 71-80.

Esther Levin, Naftali Tishby, and Sara A. Solla (Oct. 1990) "A Statistical Approach to Learning and Generalization in Layered Neural Networks", *Proc. IEEE*, vol. 78, No. 10, pp. 1568-1574.

Les Atlas, Jerome Connor and Mark Damborg (1991) "Comparisons of Conventional Techniques and Neural Network in Computer-aided Design", Artifical Intelligence in Engineering, 5(1):9-22.

Miodrag Djukanov, Borivoje Babic, Dijan J. Sobajic and Yoh-Han Pao (1991) "Unsupervised/Supervised Learning Concept for 24-Hour Load Forecasting", *Artificial Intelligence in Engineering*, pp. 819-827.

M.M. Gupta and J. Qi (1991) "Fusion of Fuzzy Logic and Neural Networks with Applications to Decision and Control Problems", *Proceedings of the 1991 American Control Conference*, pp. 1:30-31.

Jocelyn Sietsma and Robert J. F. Dow (1991) "Creating Artificial Neural Networks That Generalize", *Neural Networks*, vol. 4, pp. 67-79.

Petros A. Ioannou and Aniruddha Datta (Dec. 1991) "Robust Adaptive Control: A Unified Apporach", *Proc. IEEE*, vol. 79, No. 12, pp. 1736-1768.

S.A. Billings, H.B. Jamaluddin and S. Chen (1992) "Properties of neural networks with applications to modeling non-linear dynamical systems", *Int. J. Control*, pp. 55(1):193-224.

John Doleac, Jeff Getchius, Judy Franklin and Chuck Anderson (1992) "Nadaline Connectionist Learning vs. Linear Regression at a Lamp Manufacturing Plant", *Proceedings of The First Conference on Control Applications*, pp. 552-558.

William Finnoff, Ferdinand Hergert, and Hans Georg Zimmerman (1993) "Improving Model Selection by Nonconvergent Methods", *Neural Networks*, vol. 6, pp. 771-783.

Andreas Ikonomopoulos, Lefteri H. Tsoukalas and Robert E. Uhrig (1993) "A Hybrid Neural Networ-Fuzzy Arithmetic Methodology For Performing Virtual Measurements in a Complex System", *Proceedings of the Thirty-Sixth Power Instrumentation Symposium*, pp. 205-212.

Michael Nikolaou (1993) "Neural Network Modeling of Nonlinear Dynamical Systems", *Proceeding of the 1993 American Control Conference*, pp. 1460-1464.

Stevan V. Odri, Dusan P. Petrovacki, and Gorana A. Krstonosic (1993) "Evolutional Development of a Multilevel Neural Network", *Neural Networks*, vol. 6, pp. 583-595.

Yoh-Han Pao and Gwang-Hoon Park (1993) "Neural-Net Computing for Machine Recognition of Handwritten English Language text", *Fundamentals of Handwriting Recognition*, pp. 335-351.

Mujeeb M. Ahmed (1994) "An Integrated Approach to Distributed Intelligent Control", *Proceeding of the Thirty-Seventh Power Instrumentation Symposium*, pp. 1-15.

Timothy J. Graettinger, Naveen V. Bhat and Jeffrey S. Buck (1994) Adaptive Control with NeuCOP, the Neural Control and Optimization Package, *IEEE*, pp. 2389-2393.

Yoh-Han Pao (1994) "Process Monitoring and Optimization for Power Systems Applications", *IEEE International Conference on Neural Networks*, pp. 3697-3702.

Percy P.C. Yip and Yoh-Han Pao (1994) "A Guided Evolutionary Computation Technique as Function Optimizer", *Proceeding of First IEEE Conference on Evolutionary Computation*, pp. 628-633.

Stuart J. Russell and Peter Norvig, (1995) "Learning From Observations", *Artificial Intelligence: A Modern Approach*, pp. 525-562.

Mattias Nyberg and Yoh-Han Pao (1995) "Automatic Optimal Design of Fuzzy Systems Based on Universal Approximation and Evolutionary Programming", *Fuzzy Logic and Intelligent Systems*, pp. 311-366 (edited by H.L. Hua and M. Gupta).

Percy P.C. Yip and Yoh-Han Pao (1995) "Combinatorial Optimization with Use of Guided Evolutionary Simulated Annealing", *IEEE Transaction on Neural Networks*, 6(2):290-295.

Yoh-Han Pao (1996) "Dimension Reduction Feature Extraction and Interpretation of Data With Network Computing", *International Journal of Patter Recognition and Artificial Intelligence*, pp. 10(5)521-253.

Yoh-Han Pao and Zhou Meng (1996) "A Perspective on Functional-Link Computing, Dimension Reduction and Signal/Image Understanding", *Proceedings of 1996 IEEE Signal Processing Society Workshop*, pp. 213-222.

Michael J. A. Berry and Gordon Linoff, (1997) *Data Mining Techniques For Marketing, Sales and Customer Support*, Chapters 2, 5 and 12, pp. 17-35, 63-93 and 243-285.

Floriana Esposito, Donato Malerba and Giovanni Semeraro, (May 1997) "A Comparative Analysis Of Methods For Pruning Decision Trees", *IEEE Transaction on Pattern Analysis and Machine Intelligence*, 19(5):476-491.

Byung Hwan Jun, Chang Soo Kim, Hong-Yeop Song and Jaihie Kim, (Dec. 1997) "A New Criterion in Selection and Discretization of Attributes for the Generation of Decision Trees", *IEEE Transaction on Pattern Analysis and Machine Intelligence*, 19(12):1371-1375.

Yoh-Han Pao and Chang-Yun Shen (1997) "Visualization of Pattern Data Through Learning of Non-linear Variance-Conserving Dimension-Reduction Mapping", *Pattern Recognition*, 30(10):1705-1717.

Paul S. Bradley, Usama M. Fayyad and Cory A. Reina, (Jun. 1998) "Scaling Clustering Algorithms to Large Databases", Proc. 4th Int'l Conf. Knowledge Discovery & Data Mining, pp. 9-15.

Yoh-Han Pao and Zhou Meng (1998) "Visualization and the understanding of multidimensional data", *Engineering Applications of Artificial Intelligence*, 11:659-667.

Sholom M. Weiss and Nitin Indurkhya (1998) *Predictive Data Mining: A Practical Guide*, pp. 119-123 and 136-142.

Michael J. A. Berry and Gordon Linoff, (2000) *Mastering Data Mining The Art and Science of Customer Relationship Management*, pp. 59-64 and 111-121.

Timo Koskela (2000) "Decision Trees", http://www.hut.fi/~timoko/treeprogs.html.

Zhou Meng and Yoh-Han Pao (2000) "Visualization and Self-Organization of Multidimensional Data through Equalized Orthogonal Mapping", IEEE Transaction on Neural Networks, pp. 11(4):1031-1038.

* cited by examiner

AUTOMATIC MODEL MAINTENANCE THROUGH LOCAL NETS

CROSS-REFERENCE TO RELATED APPLICATIONS

This application claims the benefit of the following commonly assigned provisional applications:

(a) Ser. No. 60/374,064, filed Apr. 19, 2002 and entitled "PROCESSING MIXED NUMERIC AND/OR NON-NUMERIC DATA";

(b) Ser. No. 60/374,020, filed Apr. 19, 2002 and entitled "AUTOMATIC NEURAL-NET MODEL GENERATION AND MAINTENANCE";

(c) Ser. No. 60/374,024, filed Apr. 19, 2002 and entitled "VIEWING MULTI-DIMENSIONAL DATA THROUGH HIERARCHICAL VISUALIZATION";

(d) Ser. No. 60/374,041, filed Apr. 19, 2002 and entitled "METHOD AND APPARATUS FOR DISCOVERING EVOLUTIONARY CHANGES WITHIN A SYSTEM";

(e) Ser. No. 60/373,977, filed Apr. 19, 2002 and entitled "AUTOMATIC MODEL MAINTENANCE THROUGH LOCAL NETS"; and (f) Ser. No. 60/373,780, filed Apr. 19, 2002 and entitled "USING NEURAL NETWORKS FOR DATA MINING".

TECHNICAL FIELD

This application relates to system modeling. In particular, the application relates to automatic model maintenance.

DESCRIPTION OF RELATED ART

A system model defines a mapping from input space to system behavior space. In other words, the model describes system behaviors for selected inputs. The model may be used, for example, to perform predictive analysis of the modeled system, in place of running the system.

The parameters of a system model are derived from, or formed through training with, a set of training data ("training set"). Accuracy of the model affects quality of results when the trained model is in operation (often also called "consultation"), and largely depends on the training set. Ideally, the training set is representative of the system under all circumstances.

After a system model is formed (or trained) with a training set, new data points typically are still collected over time from the system. The new data points contain characteristics of the underlying system at the time(s) the new data are collected, which may or may not have changed since the time at which data were collected from the system for the training set. The new data points may contain characteristics that were not represented in the training set used to construct the original model. Even if the training set which is used to compute model parameters is representative of the system and the model is an accurate representation of the training set, the model may be representative of system behavior only for the times at which the data in the training set were collected. Therefore, it may be desirable to utilize the newly available data points to update the model.

In some instances, system behavior changes dynamically and the underlying dynamics of the system may not be easily predictable. For example, the system dynamics may change after data for a training set are collected (FIG. 1A). Alternatively or additionally, the training set may only be representative of partial system behavior (FIG. 1B). Under both sets of circumstances, a system model may (i) perform well for a period of time but perform unacceptably after the time period, or (ii) perform well some times but fail at other times.

Under the circumstances shown in FIG. 1A, newly available data occupy the same region(s) of the input space as the original data. However, the system dynamics have changed from X to X', which cause new system outputs corresponding to new data inputs to be different from the system outputs corresponding to the original data inputs. However, a conventional system model trained with the original data usually produces, when consulted with new input data, output values which are appropriate under old system dynamics X but not accurately representing new system dynamics X'.

Under the circumstances shown in FIG. 1B, newly available data occupy a region of the input space different from the region occupied by the original data. The system dynamics X is composed of portions Xo and Xn. The trained model only captured the Xo part of the system dynamics. Although the system dynamics X remains the same, the model performance for new data points may be unacceptable.

New (input and output) data points typically are continually collected after formation (or training) of a system model. The model may be consulted with a test set of collected data (and model outputs corresponding to the test set are compared to actual system response), to detect any significant discrepancy between the model prediction and the actual system response and to determine whether any poor performance by the model is abnormal behavior (e.g., bad sensor) or inadequacy (failure) of the model. Although a failed model in some instances can be replaced by a new model established (or trained) by using newly available data, retraining is usually an expensive task and requires a long period of time (to establish a new model by processing all the new data points and perhaps in combination with the previous training data), which may even be prohibitive especially for real-time applications.

It is desirable to be able to gradually incorporate newly available data into an existing model (i.e., to perform maintenance on the existing model) to prolong the model's useful life. Effective maintenance of a system model typically is a critical issue for maintaining adequate performance in the long term.

Further, model maintenance is different from routine processes, such as an oil change for a car. The tasks in an oil change and how the tasks may be performed are clearly known. In contrast, model parameters to be changed and how to change them for model maintenance typically are not well defined (which is especially true for a neural net model).

Neural net is a favored methodology for forming a model of a system with unfamiliar dynamics, because neural nets can be a universal approximator and therefore neural net models may be used in a wide range of applications. Neural nets have, however, a blackbox nature, that is, the function of a parameter in a neural net model cannot be easily identified, which renders model maintenance for a neural net very difficult. Maintenance methodologies for a neural net model often are referred to as "adaptive learning". While adaptive learning may be performed through modifying weights and structure of an existing neural net model, some undesired side effects may result, depending on the characteristics of new data compared with the characteristics of training data used to form the original neural net model.

For example, one technique for tuning parameters of a trained neural net model with new data is to use back propagation with a small learning rate and/or a small number of iterations. This adaptive learning technique is most suitable for a hidden layer net structure. However, it is difficult to determine an appropriate value for the learning rate and/or an appropriate number of iterations. If the values are too small, the corresponding amount of change may not be enough to adjust the model behavior. If the values are too large, the resulting model loses its memory of (e.g., from learning through) previous training data, which may be acceptable if the system dynamics have changed significantly. Memory loss is disastrous, however, if the new data points merely correspond to a first mode of system behavior which is different from a second mode in which the original data were collected, and particularly if the second mode is the dominant mode.

SUMMARY

The present application provides a model maintenance method. In one embodiment, the method includes determining that accuracy of prediction by a system model through consultation with new data is below a predetermined threshold, and forming a compound model by supplementing the system model with a local net trained with the new data.

A local net may have an associated valid data space which corresponds to the new data. A clustering or decision tree technique may be applied to the new data to determine one or more data space ranges associated with the local net. If a data point is within the associated valid data space of the local net, the local net is consulted with the data point and a result of consulting the local net is returned. If the data point is not within the associated valid data space of the local net, the system model is consulted with the data point and a result of consulting the system model is returned.

If accuracy of prediction by the compound model through consultation with additional new data is below the predetermined threshold, an updated compound model may be formed by supplementing the original compound model with a second local net formed with the additional new data. If a data point is within a valid data space of the second local net, the second local net is consulted with the data point and a result of consulting the second local net is returned. If the data point is not within the valid data space of the second local net and is within the valid data space of the first local net, the first local net is consulted with the data point and a result of consulting the first local net is returned. If the data point is not within the valid data space of the second local net and is not within the valid data space of the first local net, the system model is consulted with the data point and a result of consulting the system model is returned. As more new data points become available and if the performance of the current model degrades, additional local nets can be added incrementally to maintain the quality performance of the model.

Data collection for updating the model may be automated. According to one embodiment, error of model prediction is determined when the current model is consulted with a new data point, and the new data point is added to a new training set if the error corresponding to consultation of the model with the new data point is not below a data collection threshold. The new training set is used to establish a new local net (and the current model is updated by supplementing the model with the new local net), when the error corresponding to consultation of the model with the new data point is above a model update threshold. In addition, a new local net also may be established through the new training set when a number of data points in the new training set reaches a maximum number. According to another embodiment, the new training set is not used to establish a new local net, unless a number of data points in the new training set is equal to or greater than a minimum number. Outliers may be removed from the new training set, before the new training set is used to establish a new local net.

A model maintenance method, according to another embodiment, includes determining that accuracy of a current model is below a predetermined threshold, collecting data for adaptively updating the current model, and forming a compound model by supplementing the current model with a local net trained with the collected data.

The present disclosure also provides a compound model of a system. According to one embodiment, the compound model includes a current model, and at least one local net having an associated valid data space. If a data point is within the associated valid data space of the local net, the local net is consulted with the data point and a result of consulting the local net is returned. If the data point is not within the associated valid data space of the local net, the current model is consulted with the data point and a result of consulting the current model is returned.

In the case of more than one local net, an associated data space of each local net is tested in reverse order of creation to identify which net has the associated data space containing that data point. The net having the associated data space containing the data point is then consulted and a result of consulting the net is returned. When consultation with the compound model fails to yield satisfactory results, yet another local net may be established using the newly available data. Usage of each local net may be tracked, with infrequently used local nets being purged when the compound model is updated.

BRIEF DESCRIPTION OF THE DRAWINGS

The features of the present application can be more readily understood from the following detailed description with reference to the accompanying drawings wherein:

In FIG. 1A, X represents original mapping and X' represents evolved mapping. In FIG. 1B, Xo and Xn represent different aspects of the same mapping X that would be brought out by data in different regions;

DETAILED DESCRIPTION

The present disclosure provides tools (in the form of methodologies and systems) for model maintenance. For example, the methodologies of this disclosure may be incorporated in software-implemented systems and may be embodied in one or more computer programs or software modules stored on a conventional program storage device or computer readable medium, and/or transmitted via a computer network or other transmission medium.

The present disclosure provides methodologies for supplementing a system model with a local net formed through newly available data (hereinafter "local net methodologies"), instead of modifying system model parameters directly, when new data are available. The local net methodologies work well both for instances in which the system dynamics have shifted and instances in which the original model is only good for partial system behavior.

Figure 2:
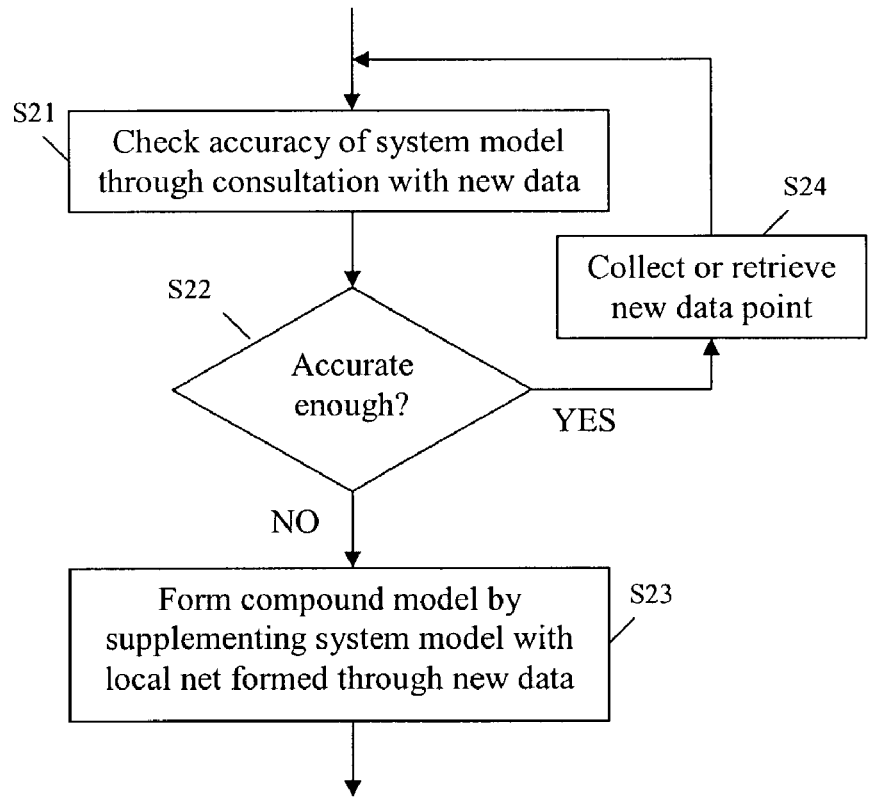
FIG. 2 shows a flow chart for a model maintenance method, in accordance with one embodiment of the present disclosure.

A model maintenance method, according to one embodiment of the present disclosure, will be described with reference to FIG. 2. Accuracy of a system model is checked through consultation with new data (step S21). If the accuracy of model prediction is below a predetermined threshold (step S22), a compound model is formed by supplementing the system model with a local net formed through training with the new data (step S23).

The term "local net", as used herein, refers to a net that is valid in a well-specified local space. Newly available data points may be used to train a local net, which is then added to the existing neural net to form a compound model. The space spanned by the data points used to train the local net is a valid data space (also referred herein as "specified space") of the local net.

The terms "adaptive learning" and "adaptive update", as used herein, means that after a model has been established or formed, additional data (corresponding either to a change of system dynamics or to one or more portions of the system behavior space not being covered by the existing model) can be used to update the model to achieve better model prediction accuracy overall. Local nets may be added to an existing model to accomplish adaptive learning.

When a system model is established through a training set, the valid ranges of the model correspond to the training data. However, the model is typically considered globally valid in the sense that the model may be consulted with a new data point in any region (but accuracy of the model's prediction depends, of course, on the training).

In contrast, a local net is valid in a defined working range. Due to limited extrapolation capabilities of neural nets in general, the valid range of a local net corresponds to the region(s) in the input space over which data used for training the local net are distributed. The local net simply does not make a prediction if a new data point falls outside its specified valid range.

A local net is also different from localized node functions (such as a Gaussian) in, for example, a radial basis function (RBF) net. A RBF net is globally valid, although it uses localized node functions. A local net is only locally valid but may use any node functions.

Figure 1A:
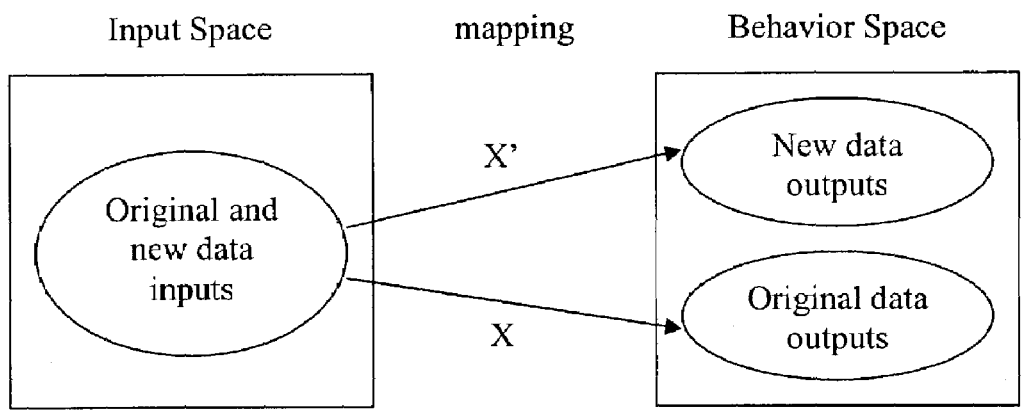
FIGS. 1A and 1B show respective diagrams of system models mapping input space to behavior space.
Figure 1B:
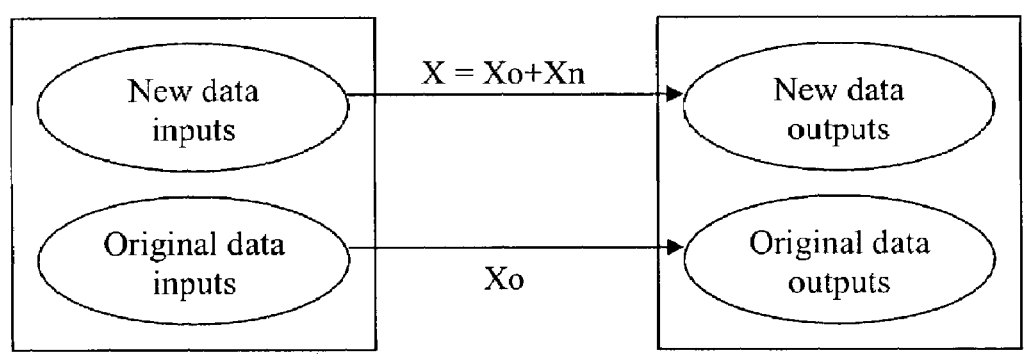

A neural net model generally has poor extrapolating capabilities as compared with its interpolating capabilities. For a group of new data points that are outside a range of data points through which the model was formed, as in the case illustrated in FIG. 1B, accuracy of a predicted value generated by the globally valid model may be unacceptable.

The remedy, according to the local net methodologies, is to provide one or more local nets to supplement an existing system model. Altogether they form an adapted compound model of the system. When a new set of data points is available, one or more local nets are built to cover the range(s) of the new data set. The local nets are then appended to the existing model to form a compound model.

Figure 3:
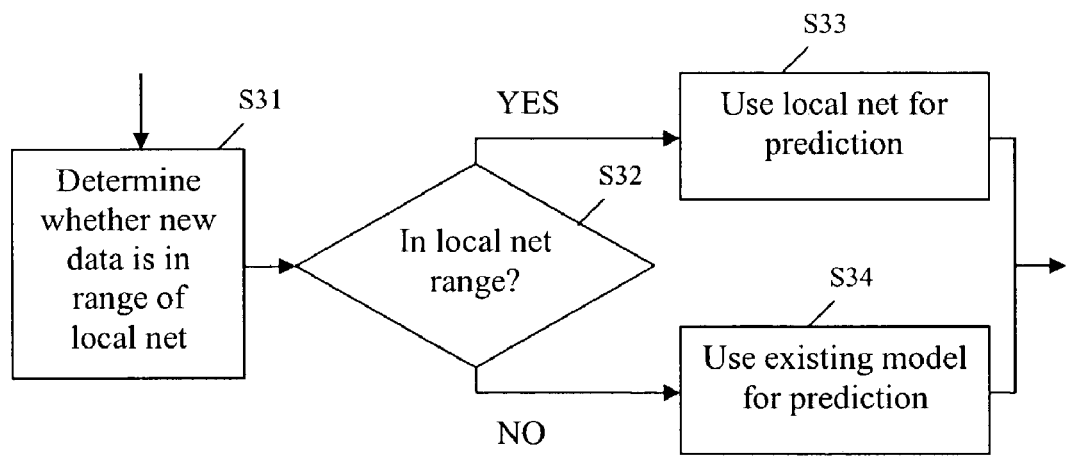
FIG. 3 shows a flow chart for a process of consulting using a compound model, in accordance with an embodiment of the present disclosure.

A process of consulting using a compound model, according to one embodiment (FIG. 3), when a new data point is being consulted, either a local net or an existing system model is used to perform a prediction, depending on whether the data point is in a valid range of the local net. When the compound model is used in consulting mode, location of a data point is first checked to determine if it falls inside a valid range of the local net (step S31).

If the data point falls inside the range of the local net (step S32, YES), the local net is used to perform the prediction (step S33). Otherwise (step S32, NO), the data point is passed up to the existing system model for prediction (step S34).

Additional local nets may be added, as more new data points become available. The local net methodologies may be recursively applied, that is, an existing model itself may be a compound model. Usage of each local net may be tracked so that very infrequently used local nets may be purged at the time of new updates to keep the overall model at a reasonable size. Thus, a series of nets may form a compound system model.

When the compound model, updated with a series of local nets, is consulted or used in prediction, each local net is tried in reverse order of creation (i.e., most recently formed is tried first). If a data point with which the model is consulted falls in the specified space of a local net, the result of consulting the local net is returned. Otherwise, the data point is passed to the previous local net to determine whether the data point falls in the associated data space of the local net (and so on, up to the original neural net). Since the original model is considered globally valid, a prediction may be returned by the original model if all local nets refuse to process a particular data point.

Figure 4:
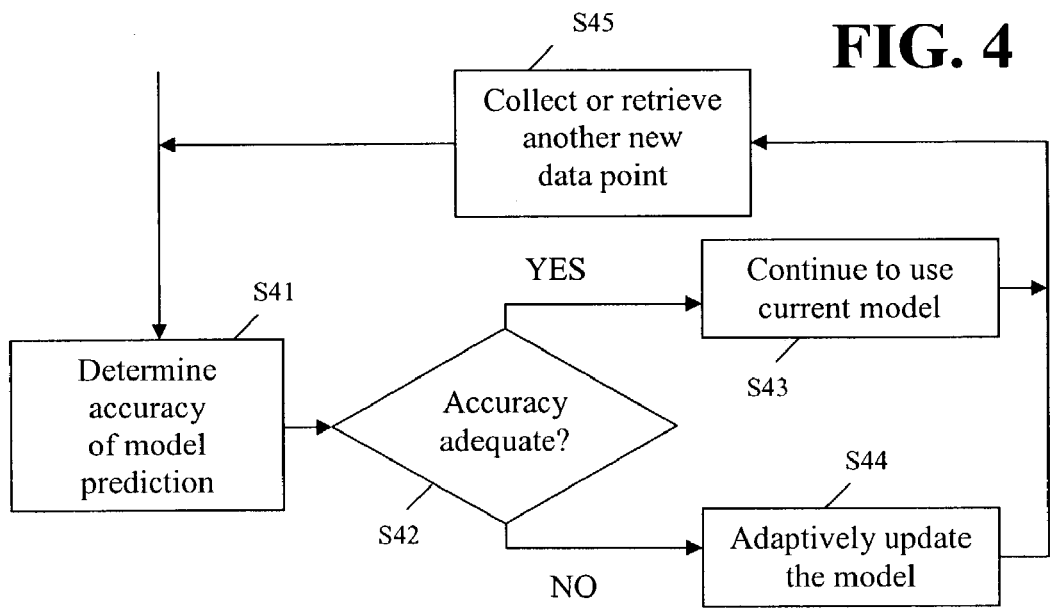
FIG. 4 shows a flow chart for a process for automatically maintaining a quality of a system model, in accordance with an embodiment of the present disclosure.

A process for automatically maintaining a quality of a compound model, according to one embodiment, will be discussed with reference to FIG. 4. When a current compound model is consulted, accuracy of model prediction is compared to a threshold (step S41). If the prediction is sufficiently accurate (step S42, YES), the current model continues to be used (step S43). If the returned value from the compound model is no longer adequately accurate (step S42, NO), it is time to perform another round of adaptive learning (step S44). After another new data point is collected for consultation (step S45), the process is repeated. Since the size of the compound model is usually also controlled, usage of individual local nets inside the compound model may be tracked. When the model is further updated, nets that are seldom used may be erased as new local nets are appended.

The local net methodologies can handle both instances in which system dynamics have changed (FIG. 1A) and instances in which the original model is only good for partial system behavior (FIG. 1B), or a combination of the two.

In the first instance, one or more local nets may be deployed to capture the new system dynamics (X' in FIG. 1A) represented in a new set of data. Since the local nets are valid in the same range(s) as the existing model, and they have precedence over the existing model, the local nets corresponding to the new system dynamics are used in consulting mode. The existing model becomes obsolete under these circumstances.

In the second instance, the local nets capture a part of the system dynamics (Xn in FIG. 1B) which includes one or more new data ranges not represented in the data set through which the existing system model was formed. Since the local nets are valid in the new data ranges, the compound model works correctly both for points in the original range and for points in the new ranges, by using the local nets for consultation with data points in the new ranges and by using the existing model for consultation with data points in the original range.

In practice, a combination of the two instances typically occurs, and the local nets partially replace the existing model and supplement the existing model, at the same time.

Figure 5:
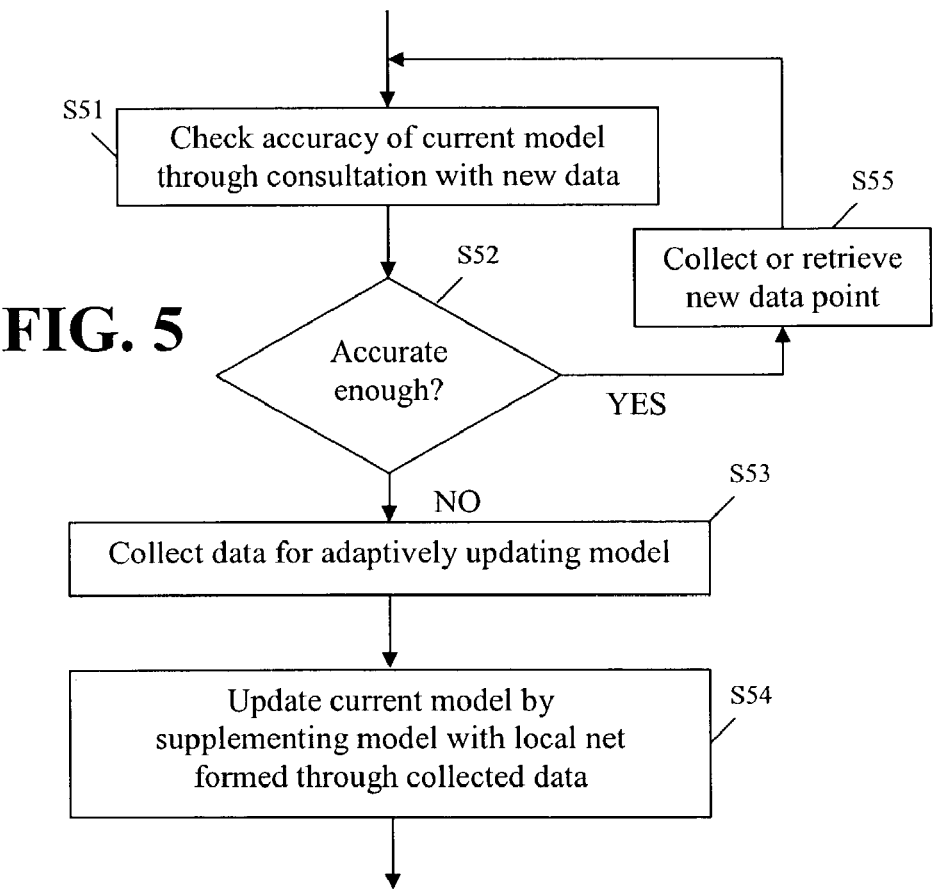
FIG. 5 shows a flow chart for a model maintenance method, in accordance with another embodiment of the present disclosure.

A method of automatic model maintenance, according to another embodiment of the present disclosure, will be described with reference to FIG. 5. Accuracy of a current model is checked through consultation with new data (step S51). If the accuracy of the model is below a predetermined threshold (step S52, NO), data are collected and/or retrieved for adaptively updating the system model (step S53). A compound model is formed by supplementing the system model with a local net formed through training with the retrieved data (step S54).

There are some practical concerns in model maintenance. One issue is how many new data points should be used to update a system model. In principle, the more data points the better. However, it is usually desirable to carry out the update as fast as possible, especially for real-time applications. Therefore, it is useful to use only data that provide new information (e.g., not represented by the existing model).

Figure 6:
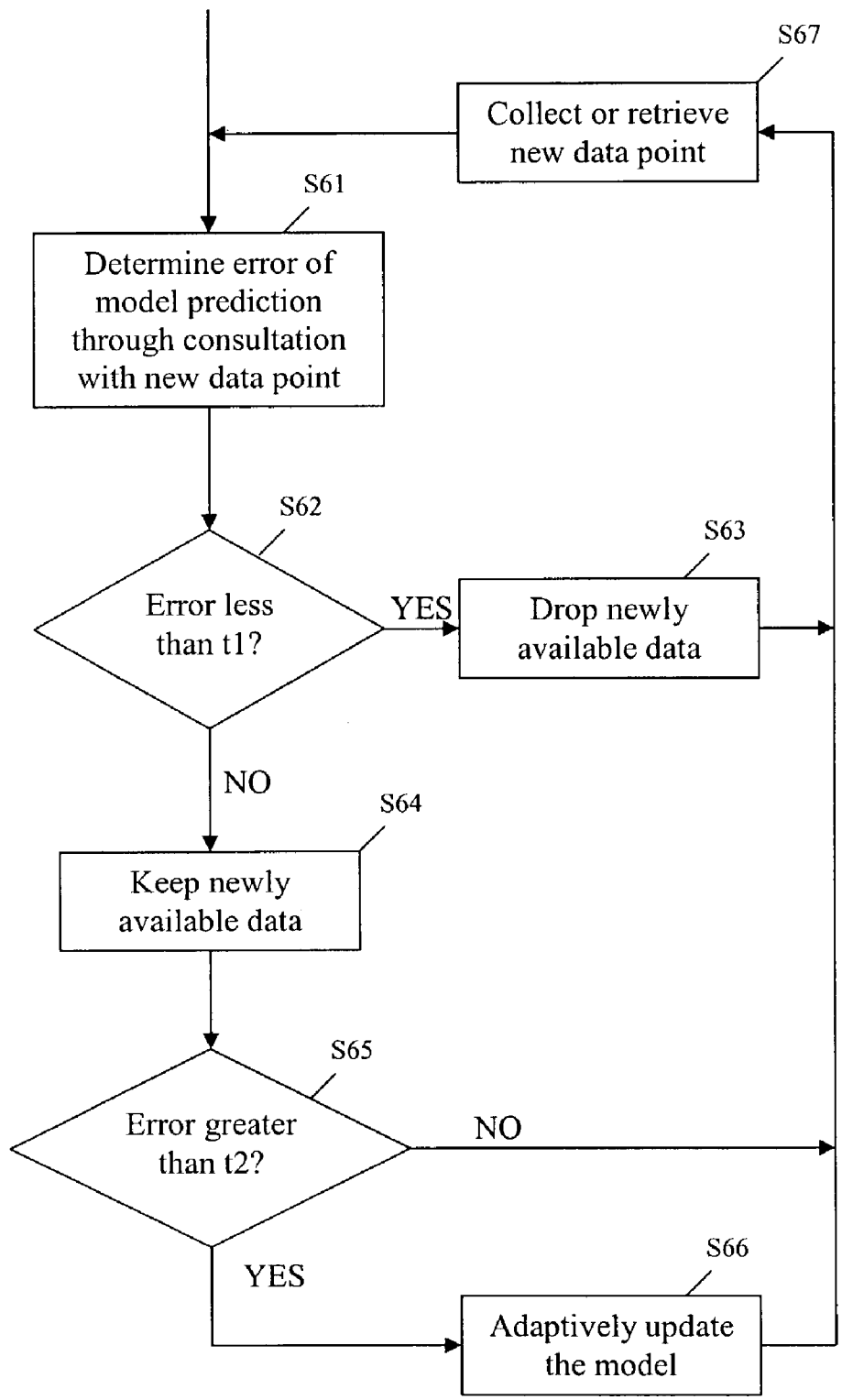
FIG. 6 shows a flow chart for a process for automated data collection and adaptive model update, in accordance with an embodiment of the present disclosure.

The local net methodologies include an optional double-threshold technique (discussed below) for determining a timing for data collection and model update, to provide automated model updates without user intervention. A process for automated data collection and adaptive model update, according to one embodiment (FIG. 6), uses two thresholds to determine whether to keep newly available data and whether to update a current model. A first threshold, $t1$, is used to determine whether newly available data contain any new information and whether to keep the new data for updating the current model. A second threshold, $t2$, is used to determine whether the model should be updated. The value of $t2$ is larger than $t1$, and each may be determined based on a typical error of the existing model on original data.

When the current model is consulted, with a new data point, error of model prediction is determined (step S61).

If the prediction error is below data collection threshold $t1$ (step S62, YES), the new data point is simply dropped. If the prediction error is not below the data collection threshold $t1$ (step S62, NO), the new data point is kept for a new training set for updating the model (step S64). If the prediction error is above model update threshold $t2$ (step S65, NO), the new training set is used to establish a local net and the current model is updated by supplementing the model with the local net (step S66). Another new data point is collected (or retrieved) [step S67] and the process is repeated.

To avoid accidental triggering of data collection and update by outliers, the new data points may be accumulated into a small set. The size of the set is large enough to be able to identify and remove outliers in the set. An average error of the set may then be used to compare with the two thresholds. A limit on a maximum number of data points may also be specified. When the prediction error crosses $t1$ but stays below $t2$ for a prolonged period, the data point limit may help to put a limit on an amount of time used to perform the adaptive model update (by limiting the number of training data points). Depending on requirements of the existing model and a preference in setup, a limit on a minimum number of data points collected before an update is initiated may also be specified. If a large sudden change is detected, the lower limit prevents the existing model from being changed and may also be used to alert the operator about such a change, since such a change usually indicates abnormal behavior either in the system or due to bad sensor.

Another practical issue is determination of local net range(s). Simple minimum and maximum values detected from training input may not be sufficient since there may be holes in a distribution of the data points between the extreme values. Clustering may be used to obtain a more precise estimate. In order to avoid a need to specify the number of clusters or a cluster radius in advance, hierarchical k-means clustering technique may be used. The hierarchical k-means clustering technique is a divisive methodology. The whole data set is first clustered into a small number of clusters. Depending on the populations of the respective resulting clusters, large clusters may be split further into smaller clusters until the populations of the clusters are moderate or a number of levels in the cluster hierarchy exceeds a selected maximum. A limit on the number of levels may be used to control a maximum complexity of the resulting model. The k-means technique may be used for each level of clustering.

After completion of the clustering process, a cluster tree may be generated. The radius of each leaf cluster in the cluster tree may be estimated based on distances from each and every member of the cluster to the cluster center, or (to a lesser degree of precision) from the furthest member in the cluster to the cluster center.

In consulting mode, when a new data point is encountered, if it falls within the radius of any one of the leaf clusters, it is considered to have fallen into the range of the associated local net. If the data point does not fall in any clusters corresponding to a local net, the data point is passed on to the existing model.

Other techniques can also be used to determine the ranges for a local net. Since the k-means technique usually generates spherical clusters which may not reflect an actual shape of a cluster (i.e., the cluster may cover more space than the members actually occupy), other partition techniques such as ISODATA and SOM may be used instead. Another possibility is to use a decision tree technique, such as CART and ID3, in place of the clustering technique.

These clustering and decision tree techniques are discussed in commonly-assigned U.S. provisional applications No. 60/374,020, entitled "AUTOMATIC NEURAL-NET MODEL GENERATION AND MAINTENANCE", and No. 60/374,041, entitled "METHOD AND APPARATUS FOR DISCOVERING EVOLUTIONARY CHANGES WITHIN A SYSTEM", which are incorporated herein in their entireties by reference.

The local net methodologies of the present disclosure have been demonstrated to be useful and effective for performing adaptive update(s) to a system model. Compared with adaptive learning techniques that update the model weights and/or structure directly, the local net methodologies provide faster convergence to a new system dynamics when the dynamics of a system shift. The local net methodologies also may absorb and utilize newly available information corresponding to new areas of system operation which were not included in the data set used to build the original model, without compromising accuracy corresponding to system operations already represented in the original model.

Combined with the automatic model structure selection capability of orthogonal functional-link net methodologies which may be used to build the original neural net model and the local nets forming the compound model, the combination of orthogonal functional link net methodologies and local net methodologies provide complete automation in model creation and maintenance. Orthogonal functional-link net methodologies are described in commonly-assigned U.S. provisional patent application No. 60/374,020, which is incorporated herein in its entirety by reference.

EXAMPLES

A non-linear time series problem is used to illustrate a process of updating a system model using the local net methodologies. The non-linear time series is simulated by the following equation:

$$y(t)=[0.8-0.5\exp(-y^2(t-1))]y(t-1)-[0.3+0.9\exp(-y^2(t-1))]y(t-2)+0.1\sin(\pi y(t-1))+e(t) \quad (1)$$

where e(t) is a zero mean noise sequence with variance 0.01. The initial conditions are y(0)=0.1 and y(−1)=0.

The problem is to use the two previous points to predict a value of the current point.

Two thousand samples of the time series were generated. The first 1000 patterns were used as the training set and the remaining 1000 were used as the validation set. Orthogonal functional-link net was used to build the original model. Gaussians were used as the functional-link nodes. The centers were determined through cluster centers and the spreads were determined from the radii of the clusters. For an error target of 5e−4, a total of 13 nodes were selected. The error for the validation set was also less than 5e−4, indicating good generalization capability of the resulting model.

To illustrate a process of maintaining optimal model performance through appending a local net, a constant drift term is added to the non-linear time series system represented by Equation (1). The modified equation is as follows, for t>1000:

$$y(t)=[0.8-0.5\exp(-y^2(t-1))]y(t-1)-[0.3+0.9\exp(-y^2(t-1))]y(t-2)+0.1\sin(\pi y(t-1))+0.25+e(t) \quad (2)$$

Another training data set containing 1000 patterns was generated. The error of consulting these patterns using the original model was 0.00316, which indicates that the current model is not an accurate representation of the current system dynamics.

Adaptive learning was then applied to the original model. An additional orthogonal functional-link net was formed as a local net using the newly available data. The resulting error of the updated compound model was again below the target training error of 5e−4. The newly added local net again has 13 Gaussian nodes.

Figure 7:
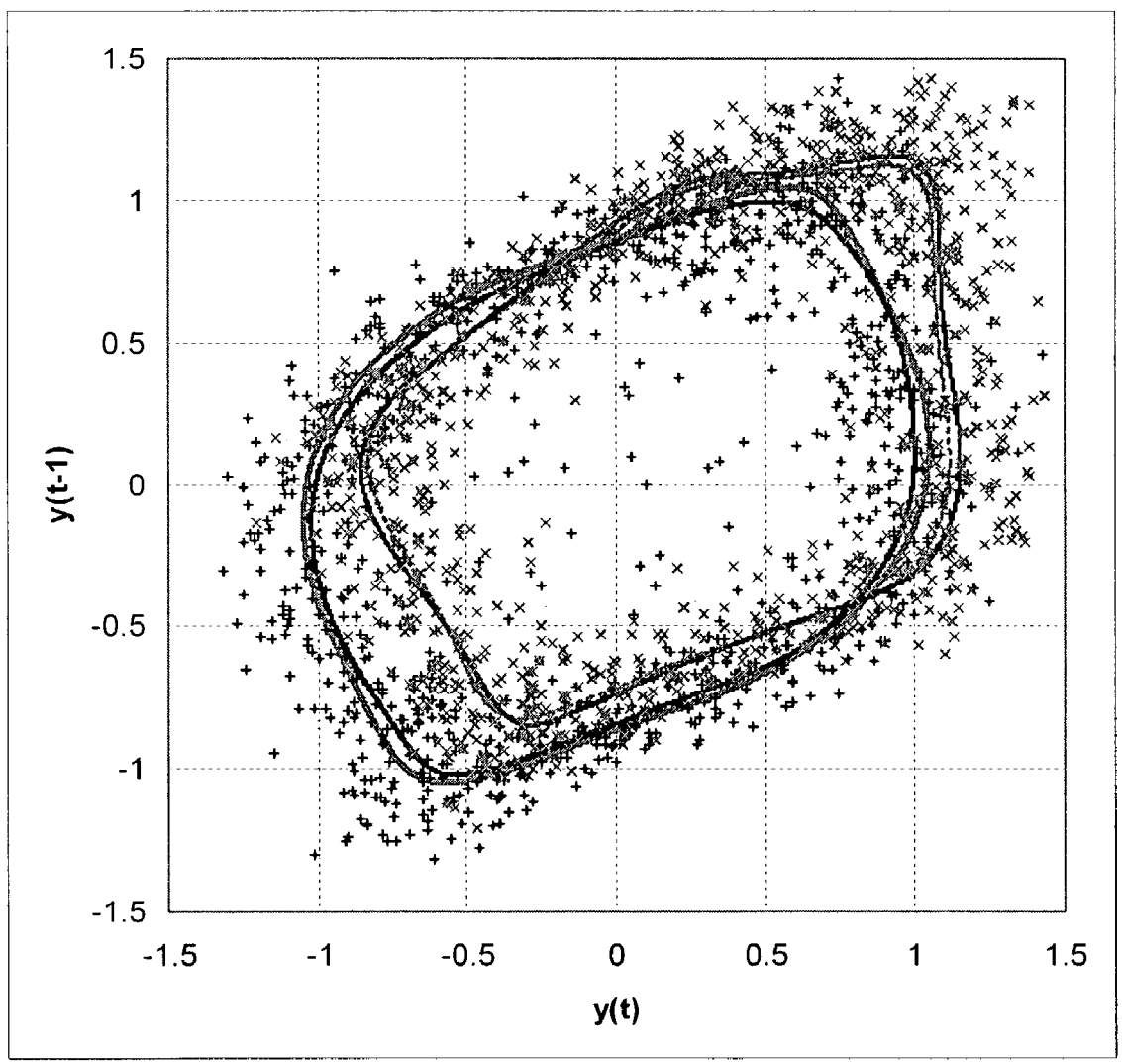
FIG. 7 shows a graphical representation of a comparison between an original model and an adaptively updated model, in a first example.

FIG. 7 illustrates results of the non-linear time series example for the original model and for the adaptively updated model. The small plus signs are positions of original training patterns. The small gray cross signs are positions of new training patterns. The gray limit cycles are theoretical limit cycles generated from Equation (1) and (2). The black limit cycles are generated from the original and updated models. The lower-left pair of gray and black limit cycles is for the original case and the upper-right set is for the modified case.

As shown in FIG. 7, the original model and the updated model are good representations of the original data and the new data, respectively. Since the data points of the new modified function occupy almost the same area as the data points of the original function, the newly built local net essentially replaces the original net in the compound model.

Compared with results obtained using the weight-update technique, the local net methodologies provide immediate catch-up with changed system dynamics. In contrast, the weight-update technique offer gradual shift from the original system dynamics towards the new system dynamics. The compound model provides better performance at the expense of a larger-sized model.

While the above example demonstrates an effectiveness of the local net methodologies in handling adaptive learning for a case of changed system dynamics, the following example shows that the local net methodologies are equally capable of handling a case of new ranges of system operation without losing knowledge of existing ranges of system operation.

A simple product of sine and cosine functions is the underlying system dynamics in the following example, as shown below in Equation (3):

$$z=\sin(2\pi x)\cos(2\pi y) \quad (3)$$

The original training data set was obtained by randomly choosing 1000 points inside the interval [0.0, 1.0] for both x and y. An orthogonal functional-link net was used to build the initial model with an error target of 1e−4. The target was met with 27 Gaussian functional-link nodes. The system may also run in the additional range of [1.0, 2.0] for x and [0.0, 1.0] for y. The additional range, however, was not represented in the original training data set. Another 1000 points randomly chosen inside the additional range formed a new training data set, and the local net adaptive learning methodologies were used to update the existing model. An additional orthogonal functional-link net was established as the local net by using the new data set. The training error went below the target of 1e−4 with 26 Gaussian functional-link nodes.

To test the performance of both the original model and the updated model in the operating range of [0.0, 2.0] for x and [0.0, 1.0] for y, a set of grid points with steps of 0.1 in the x direction and steps of 0.05 in the y direction was created as the test set, resulting in a total of 441 test points. The test set was used to consult both the original model and the updated model.

Figure 8:
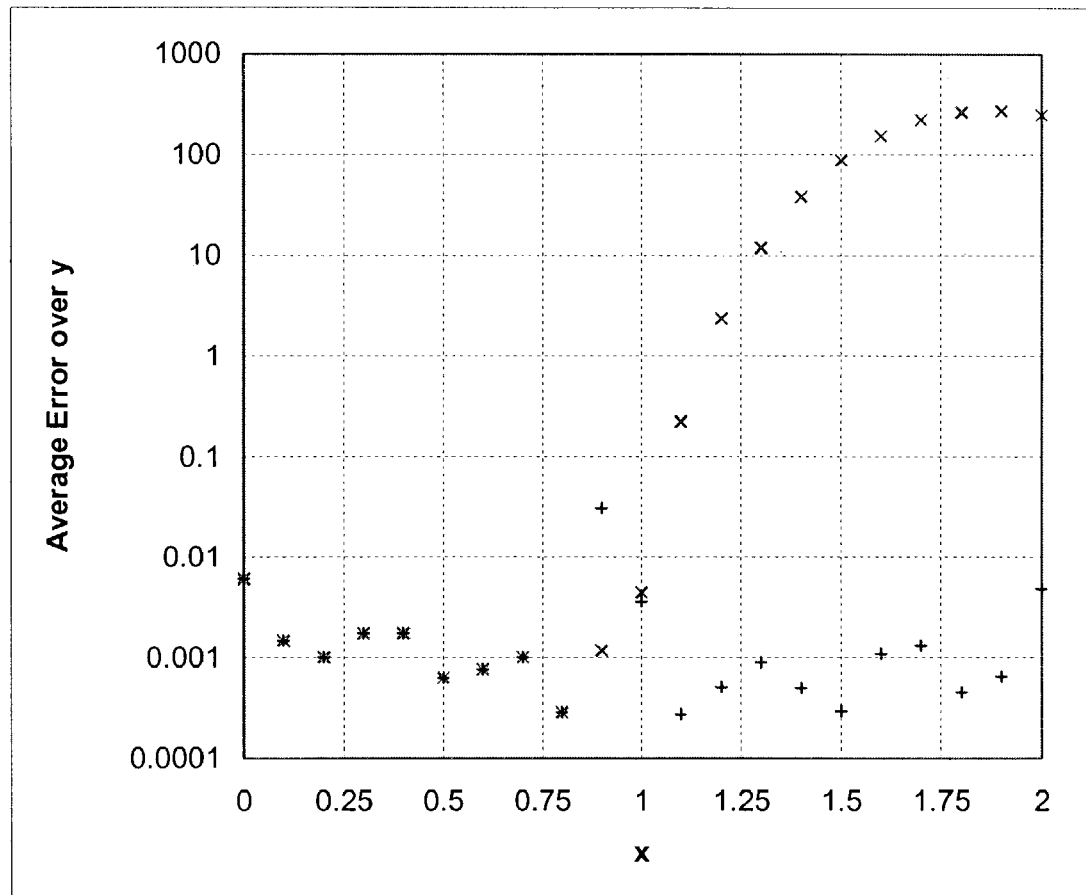
FIG. 8 shows a graphical representation of average errors of an original model and an adaptively updated model, respectively, in a second example.

FIG. 8 illustrates performance of the original and updated models over the full operating range. The gray cross signs show averaged errors of the original model over the y grid points for the corresponding x value. The black plus signs show the averaged errors of the updated model. In order to concisely show the performance, the mean-squared errors of all grid points of the same x value are averaged over.

As expected, the original model underperformed in the new range, becoming worse as the x value deviated further from the previous maximum of 1, because the neural net model has only very limited capability in extrapolation. The updated model, however, performed acceptably over the whole range, not only the new range on which the update training was carried out.

The performance of the two models initially are identical, indicating that the updated compound model actually used the original net to perform the prediction. At around x=0.9, the performance of the two models begins to show differences, which indicate that the new local net begins to take over the prediction from the original model.

The clusters are spherical (circular in 2-D), and the radius was the distance of the furthest member from the center, which caused the clusters that are close to the boundary to include slightly more areas than they actually occupy. Since this circumstance corresponds to extrapolation for the new local net, the performance of the compound model is actually worse than the original model at this point. However, as x further increased into the new range, the performance of the compound model improved and remained good while performance of the original model became unacceptable.

Overall, the performance of the updated model is acceptable over the whole range of the system. All the error values shown are actually larger than the target value of 1e−4 because the grid points happen to include extreme values both in terms of edges in the range of operation and extreme values of the system function. Since the training patterns are randomly generated in both training sets, the extreme points are not actually included in them and the errors for such points are therefore larger than average.

For the problem above, the weight-update method is unsuitable for the outlier situation (i.e., data point outside of range of training) because the node functions in the existing model are customized to fit the previously known range. Since the range is different for the newly available data, the nodes in the existing model are unsuitable to represent the new range. In the first example, the range of operation stayed almost the same. For a functional-link net with radial-basis nodes such as Gaussian ones, it is possible to add some new nodes in the new range. However, such additions may introduce interference in the original range unless the two ranges are far away which is not the case for the current problem.

Applications of the Local Net Methodologies

Many computer application software may employ system model methodologies to provide the application with abilities similar to human pattern recognition and predictive skills. The following are just a few examples in which application software may be adapted with such skills through system modeling and the model may be updated by applying local net methodologies.

A retailer periodically needs to determine an amount of merchandise to order from a supplier to avoid running out of inventory in the upcoming month, while not keeping too much inventory (e.g., above what is needed for the month). Enterprise resource planning software may include means for modeling the dynamics of the retail business and for making predictions of future sales, based on recent sales, current inventory, historical trend, etc. However, the dynamics of the retail business may change and therefore the model may require update. For example, in response to a change in demographics of visitors (for example, younger, lower-income customers) to the mall in which the retail store is located changed, the retailer may add to its store shelves lower-end merchandise, which the retailer did not sell prior to the demographics change. A local net may be added to cover a portion of the retail business dynamics, corresponding to lower-end merchandise, which was not represented in the original model. Also, another local net may need to be added to cover a change in dynamics corresponding to higher-end merchandise, which had been the focus of the retail store prior to the demographics change, because a new local sales tax has recently been imposed.

The local net methodologies also may be applied to, for example, profiling (which is known in the information technology art as "data mining"), to look for interesting data patterns in a system and, for example, associate them with (as an effect of) a cause or (as a cause of) an effect. For example, a model of consumer buying tendencies may be developed through training with a set of consumer profile data kept by an eBusiness application for a selected group of consumers. After the model has been established, the model may be supplemented with a local net when new data, for a second group of consumers who are not represented in the existing model, are obtained. An additional local net may be added because the dynamics of purchasing power have changed since the economy has undergone a boom after the existing model was formed.

As another example, utilization of resources in an enterprise information system may vary according to assorted factors (and combination of factors), such as time (for example, hour of day, day of week, or month of year, etc.), user or group, resource, etc. A model for allocating enterprise system resources may be developed based on historical resources utilization patterns. However, the original model may need to be supplemented with a local net, if, for example, wireless network interfaces are introduced into the enterprise resource pool, after the existing model is developed. Since system resources utilization may differ substantially when wireless network interfaces are available as compared to when only conventional network interfaces are available, a portion of the dynamics of resource utilization corresponding to when wireless network interfaces are used may not be represented in the original model. In addition, it may be that the system dynamics has shifted since the availability of wireless network interfaces may encourage enterprise users at large to make greater use of selected enterprise information resources which are now more accessible through a wireless network interface.

As yet another example, a value prediction model may be trained to model a production process from historical product data in a database containing process recipes (each of which contains a list of ingredients and processing conditions for producing rubber, polymers, glass, metals, petrochemicals, food, etc.) and resulting properties of the respective products. For example, a model trained to predict the properties of bread (for example, Italian bread, baguettes, rolls, loaves of multi-grain bread, etc.) recipes may receive the amounts of various ingredients and the baking conditions as inputs, and predict the measurable qualities of the bread product. Alternatively, the model may be trained to specify an appropriate recipe based on input of the desired properties. In any event, the model may be supplemented with a local net in order to model the production process of other baked goods, such as muffins, scones, etc. Another local net may be added, because the dynamics of the system changed, since an old conventional oven was swapped out for a brick oven.

The above specific embodiments are illustrative, and many variations can be introduced on these exemplary embodiments without departing from the spirit of the disclosure or from the scope of the appended claims. Elements and/or features of different illustrative embodiments may be combined with each other and/or substituted for each other within the scope of this disclosure and appended claims.

Additional variations may be apparent to one of ordinary skill in the art from reading the following U.S. provisional applications, which are incorporated in their entireties herein by reference:

(a) Ser. No. 60/374,064, filed Apr. 19, 2002 and entitled "PROCESSING MIXED NUMERIC AND/OR NON-NUMERIC DATA";

(b) Ser. No. 60/374,020, filed Apr. 19, 2002 and entitled "AUTOMATIC NEURAL-NET MODEL GENERATION AND MAINTENANCE";

(c) Ser. No. 60/374,024, filed Apr. 19, 2002 and entitled "VIEWING MULTI-DIMENSIONAL DATA THROUGH HIERARCHICAL VISUALIZATION";

(d) Ser. No. 60/374,041, filed Apr. 19, 2002 and entitled "METHOD AND APPARATUS FOR DISCOVERING EVOLUTIONARY CHANGES WITHIN A SYSTEM";

(e) Ser. No. 60/373,977, filed Apr. 19, 2002 and entitled "AUTOMATIC MODEL MAINTENANCE THROUGH LOCAL NETS" and (f) Ser. No. 60/373,780, filed Apr. 19, 2002 and entitled "USING NEURAL NETWORKS FOR DATA MINING".

What is claimed is:

1. A model maintenance method comprising:

collecting new data related to a system model, after the system model is formed;

determining that an accuracy of a prediction by the system model through consultation with the new data is below a predetermined threshold;

forming a compound model by supplementing the system model with a local net trained with the new data; and
storing the compound model on a storage device.

2. The method of claim 1, wherein the local net has an associated valid data space corresponding to a space spanned by the new data.

3. The method of claim 2, wherein when the compound model is consulted with a data point, the local net is consulted with the data point and a result of consulting the local net is returned, if the data point is within the associated valid data space of the local net.

4. The method of claim 3, wherein if the data point is not within the associated valid data space of the local net, the system model is consulted with the data point.

5. The method of claim 1, wherein the compound model is updated by supplementing the original compound model with a second local net formed through training with additional new data, if accuracy of prediction by the compound model through consulting with the additional new data is below the predetermined threshold.

6. The method of claim 5, wherein when the updated compound model is consulted with a data point, the second local net is consulted with the data point and a result of consulting the second local net is returned, if the data point is within a valid data space of the second local net.

7. The method of claim 6, wherein the first local net is consulted with the data point and a result of consulting the first local net is returned, if the data point is not within the valid data space of the second local net and is within the associated valid data space of the first local net.

8. The method of claim 7, wherein the system model is consulted with the data point and a result of consulting the system model is returned, if the data point is not within the valid data space of the second local net and is not within the valid data space of the first local net.

9. The method of claim 1, wherein error of model prediction is determined when the current model is consulted with a new data point, and the new data point is added to a new training set if the error corresponding to consultation of the model with the new data point is not below a data collection threshold.

10. The method of claim 9, wherein the new training set is used to establish a new local net and the current model is updated by supplementing the model with the new local net, if the error corresponding to consultation of the model with the new data point is above a model update threshold.

11. The method of claim 9, wherein when a number of data points in the new training set reaches a maximum number, the new training set is used to establish a new local net, and the current model is updated by supplementing the model with the new local net.

12. The method of claim 9, wherein the new training set is not used to establish a new local net, unless a number of data points in the new training set is equal to or greater than a minimum number.

13. The method of claim 9, wherein outliers are removed from the new training set.

14. The method of claim 1, wherein a clustering technique or decision tree technique is applied to the new data to determine one or more data space ranges associated with the local net.

15. A computer system, comprising:
a processor; and
a program storage device readable by the computer system, tangibly embodying a program of instructions executable by the processor to perform a model maintenance method, the method comprising:
collecting new data related to a current model, after the current model is formed;
determining that an accuracy of a prediction by the current model through consultation with the new data is below a predetermined threshold;
forming a compound model by supplementing the current model with a local net trained with the new data; and
storing the compound model.

16. A program storage device readable by a machine, tangibly embodying a program of instructions executable by the machine to perform a model maintenance method, the method comprising:
collecting new data related to a system model, after the system model is formed;
determining that an accuracy of a prediction by a current model through consultation with the new data is below a predetermined threshold;
forming a compound model by supplementing the current model with a local net trained with the new data; and
storing the compound model.

17. A model maintenance method comprising:
determining that an accuracy of a current model is below a predetermined threshold;
collecting data related to the current model, after the current model is formed, for adaptively updating the current model;
forming a compound model by supplementing the current model with a local net trained with the collected data; and
storing the compound model.

18. The method of claim 17, wherein inadequacy of the prediction accuracy of the current model is attributed to training with training data corresponding to only partial system behavior.

19. The method of claim 17, wherein deterioration of model prediction accuracy is attributed to a shift to system dynamics after the current model was established.

20. The method of claim 19, wherein one or more local nets are added to the compound model to capture the new system dynamics.

21. The method of claim 17, wherein inadequacy of the prediction accuracy of the current model is attributed to a combination of (a) training with training data corresponding to only partial system behavior, and (b) a change of system dynamics after the current model was established.

22. A compound model of a system, comprising:
a current model;
new data related to a current model, the new data collected after the current model is formed;
at least one local net having an associated valid data space, wherein when the compound model is consulted with a data point of the new data, the local net is consulted with the data point and a result of consulting the local net is returned, if the data point is within an associated valid data space of the local net, and the current model is consulted with the data point and a result of consulting the current model is returned, if the data point is not within the associated valid data space of the local net.

23. The compound model of claim 22, wherein the compound model is updated repeatedly by adding a series of additional local nets formed through training with new data points, if accuracy of predictions by the compound model through consultations with the new data points is below a predetermined threshold.

24. The compound model of claim 23, wherein the updated compound model is consulted with a new data point by comparing the new data point to the valid data spaces of the local nets in reverse order to identify one of the local nets which has a valid data space within which the new data point falls, consulting the identified local net with the new data point, and returning a result of consulting the identified local net with the new data point.

25. The compound model of claim 23, wherein usage of each local net is tracked, and infrequently used local nets are purged when the compound model is updated.

26. A model maintenance method, comprising:
applying data to a system model to return a prediction;
upon determining that the accuracy of the prediction of the system model is below a first threshold, training a first local net, the first local net having a first associated data space;
supplementing the system model with the first local net to form a first compound model;
storing the first compound model; and
applying subsequent data to the first compound model, wherein:
  upon determining that a data point of the subsequent data is within the first associated data space of the first local net, consulting the first local net with the data point and returning a prediction; and
  upon determining that a data point of the subsequent data is not within the first associated data space of the first local net, consulting the system model with the data point and returning a prediction.

27. The method of claim 26:
further comprising:
  collecting and storing at least two data points;
  clustering the collected data points into at least one cluster; and
  determining the first associated data space based on the collected data points of the at least one cluster; and
wherein training the first local net comprises training the first local net using the collected data points of the at least one cluster.

28. The method of claim 10, further comprising:
upon determining that an accuracy of the predication of the first compound model is below a first threshold, training a second local net, the second local net having a second associated data space;
supplementing the first compound model with the second local net to form a second compound model;
storing the second compound model; and
applying subsequent data to the second compound model, wherein:
  upon determining that a data point of the subsequent data is within the second associated data space of the second local net, consulting the second local net with the data point and returning a prediction;
  upon determining that a data point of the subsequent data is not within the second associated data space of the second local net and is within the first associated data space of the first local net, consulting the first local net with the data point and returning a prediction; and
  upon determining that a data point of the subsequent data is not within the first associated data space of the first local net and is not within the second associated data space of the second local net, consulting the system model with the data point and returning a prediction.

* * * * *